(12) United States Patent
Tsuruoka

(10) Patent No.: US 11,807,224 B2
(45) Date of Patent: Nov. 7, 2023

(54) AUTOMATED VALET PARKING SYSTEM

(71) Applicant: TOYOTA JIDOSHA KABUSHIKI KAISHA, Toyota (JP)

(72) Inventor: Noriyuki Tsuruoka, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/558,879

(22) Filed: Dec. 22, 2021

(65) Prior Publication Data

US 2022/0234572 A1  Jul. 28, 2022

(30) Foreign Application Priority Data

Jan. 25, 2021 (JP) ................................ 2021-009428

(51) Int. Cl.
  *B60W 30/06* (2006.01)
  *G06V 20/58* (2022.01)
  (Continued)

(52) U.S. Cl.
  CPC ........... *B60W 30/06* (2013.01); *G05D 1/0212* (2013.01); *G05D 1/0238* (2013.01);
  (Continued)

(58) Field of Classification Search
  CPC ...... B60W 30/06; B60W 30/08; B60W 40/02; B60W 60/001; B60W 2420/42; B60W 2520/06; G05D 1/0212; G05D 1/0238; G05D 1/0246; G05D 2201/0213; G06V 20/586; G08G 1/14; G08G 1/096725; G08G 1/168; G08G 1/0969; G08G 1/148; G08G 1/09; G08G 1/16; G01S 2013/9318;
  (Continued)

(56) References Cited

U.S. PATENT DOCUMENTS

2010/0156672 A1  6/2010 Yoo et al.
2015/0142267 A1  5/2015 Lee
  (Continued)

FOREIGN PATENT DOCUMENTS

CN  112071111 A     12/2020
CN  113470422 A *  10/2021 ........... G05D 1/0214
  (Continued)

*Primary Examiner* — Daryl C Pope
(74) *Attorney, Agent, or Firm* — Dickinson Wright, PLLC

(57) ABSTRACT

An automated valet parking system includes a parking lot management server configured to: acquire information on a plurality of traveling coordinates arranged along a runway of a parking lot to an entrance of a target parking space based on a vehicle position of an autonomous driving vehicle, a position of the target parking space, and parking lot map information; generate a trajectory of the vehicle based on the information on the traveling coordinates and a result of detection from an in-vehicle external sensor; and determine whether the entrance of the target parking space is recognizable based on an object recognition range; and generate the trajectory that brings the vehicle closer to the target parking space so that the object for recognizing the entrance of the target parking space is included in the object recognition range when it is determined that the entrance of the target parking space is not recognizable.

3 Claims, 10 Drawing Sheets

(51) Int. Cl.
  *G05D 1/02*   (2020.01)
  *G08G 1/14*   (2006.01)

(52) U.S. Cl.
  CPC ......... *G05D 1/0246* (2013.01); *G06V 20/586* (2022.01); *G08G 1/14* (2013.01); *G05D 2201/0213* (2013.01)

(58) Field of Classification Search
  CPC ..... G01S 2013/9323; G01S 2013/9324; B62D 15/0285; B60R 11/04; G01C 21/34
  See application file for complete search history.

(56) References Cited

U.S. PATENT DOCUMENTS

| | | |
|---|---|---|
| 2020/0384983 A1 | 12/2020 | Noguchi et al. |
| 2021/0239474 A1 | 8/2021 | Tsuruoka |
| 2021/0302978 A1 | 9/2021 | Noguchi et al. |

FOREIGN PATENT DOCUMENTS

| | | | | |
|---|---|---|---|---|
| JP | 2018-039294 A | | 3/2018 | |
| JP | 2020131787 A | | 8/2020 | |
| JP | 2020-201700 A | | 12/2020 | |
| JP | 2021124942 A | | 8/2021 | |
| JP | 2021162960 A | * | 10/2021 | ........... G05D 1/0214 |

* cited by examiner

AUTOMATED VALET PARKING SYSTEM

TECHNICAL FIELD

The present disclosure relates to an automated valet parking system.

CROSS-REFERENCE TO RELATED APPLICATION

This application claims the benefit of priority from Japanese Patent Application No. 2021-009428, filed on. Jan. 25, 2021, the entire contents of which are incorporated herein by reference.

BACKGROUND

Japanese Unexamined Patent Publication No. 2020-131787 discloses a control device for causing a vehicle to autonomously travel to a target location. Instruction information generated based on obstacle information, vehicle information, and map information is transmitted to the vehicle.

SUMMARY

In this technical field, an in-vehicle external sensor of an autonomous driving vehicle traveling on a runway may recognize an object for recognizing an entrance of a target parking space facing the runway. An object recognition range in which an object is recognized with at least a certain accuracy using the external sensor is determined in advance based on specifications of the external sensor, the vehicle-mounted position, and the like. Therefore, there is a possibility that the object to be recognized is located outside the object recognition range, for example, on a wide runway.

An object of the present disclosure is to provide an automated valet parking system for ensuring object recognition for recognizing an entrance of a target parking space.

According to one aspect of the present disclosure, there is provided an automated valet parking system in which a parking lot management server that manages a parking lot gives an instruction to an autonomous driving vehicle in the parking lot to cause the autonomous driving vehicle to be automatically parked in a target parking space in the parking lot. The system includes a traveling coordinate acquisition unit configured to acquire information on a plurality of traveling coordinates arranged along a runway of the parking lot to an entrance of the target parking space based on a vehicle position of the autonomous driving vehicle, a position of the target parking space, and parking lot map information, and a trajectory generation unit configured to generate a trajectory of the autonomous driving vehicle based on the information on the traveling coordinates and a result of detection from an in-vehicle external sensor. The trajectory generation unit is configured to determine whether or not the entrance of the target parking space is recognizable based on an object recognition range that is a range in which an object is recognized with at least a certain accuracy using the external sensor and is a range based on a predetermined position of the autonomous driving vehicle, the information on the traveling coordinates, and the position of the target parking space, and generate the trajectory that brings the autonomous driving vehicle closer to the target parking space on the runway so that the object for recognizing the entrance of the target parking space is included in the object recognition range when it is determined that the entrance of the target parking space is not recognizable.

With the automated valet parking system according to one aspect of the present disclosure, whether or not the entrance of the target parking space can be recognized is determined based on the object recognition range, the information on the traveling coordinates, and the position of the target parking space. the trajectory that brings the autonomous driving vehicle closer to the target parking space on the runway is generated so that the object for recognizing the entrance of the target parking space is included in the object recognition range when the entrance of the target parking space is determined to be unrecognizable, for example, when there is a possibility that the object to be recognized is located outside the object recognition range. Thereby, it is possible to prevent the object to be recognized from being located outside the object recognition range. Therefore, it is possible to ensure the recognition of the object for recognizing the entrance of the target parking space.

In one embodiment, the traveling coordinates may include a first coordinate that is a coordinate constituting the trajectory and is located on the runway facing the target parking space, and the trajectory generation unit may generate the trajectory for bringing the autonomous driving vehicle closer to the target parking space on the runway in advance before the autonomous driving vehicle reaches the first coordinate.

In one embodiment, the traveling coordinates may include a first coordinate that is a coordinate constituting the trajectory and is located on the runway facing the target parking space, and a second coordinate that is a coordinate constituting the trajectory and is located behind the first coordinate by a predetermined number in an advancing direction of the autonomous driving vehicle, and the trajectory generation unit may generate the trajectory to bring the autonomous driving vehicle closer to the target parking space in a section ahead of the second coordinate.

With the automated valet parking system according to one aspect of the present disclosure, it is possible to ensure the recognition of the object for recognizing the entrance of the target parking space.

DETAILED DESCRIPTION

Hereinafter, an embodiment of the present disclosure will be described with reference to the drawings.

Figure 1:
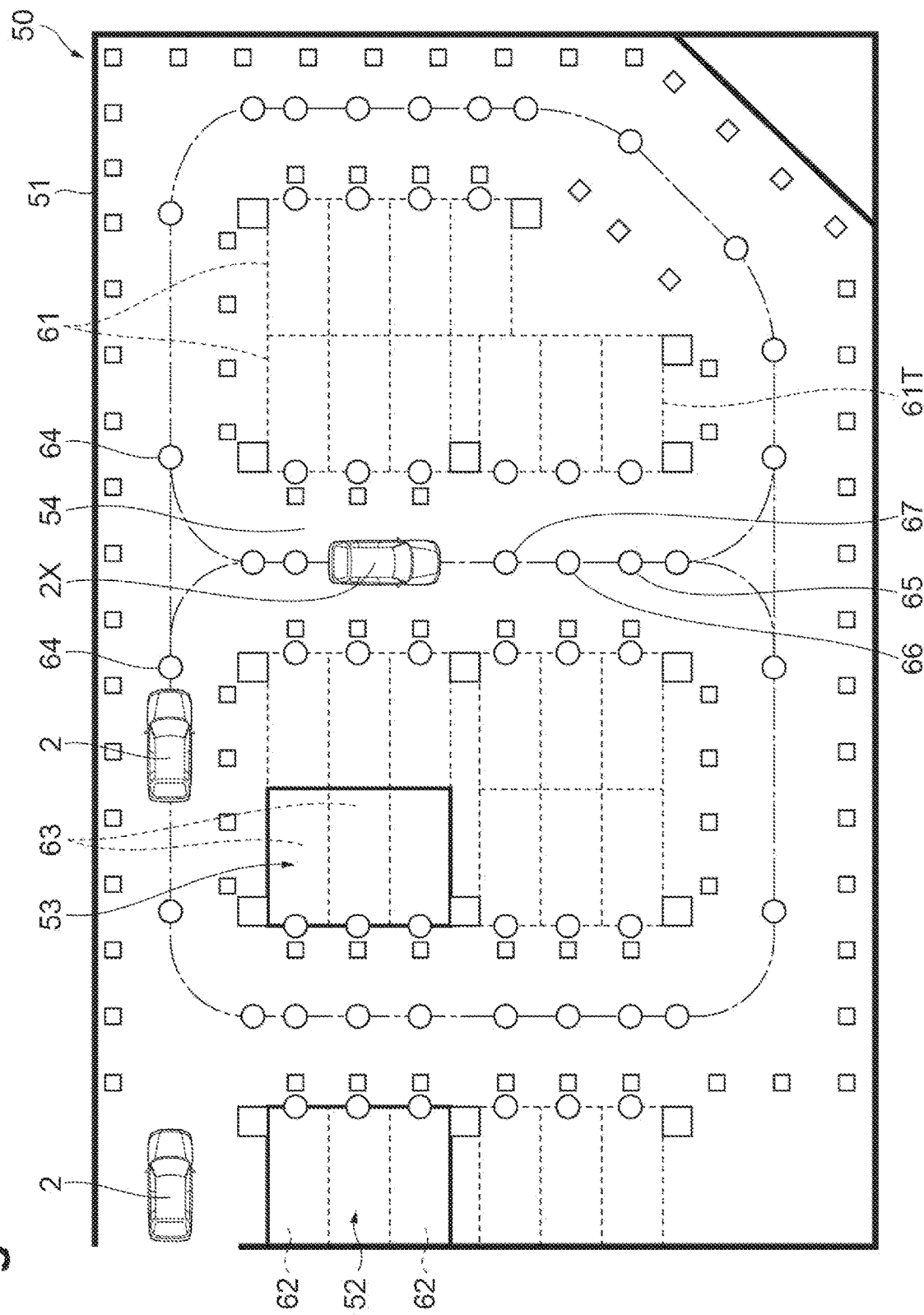
FIG. 1 is a plan view illustrating an example of a parking lot where automated valet parking is performed.

FIG. 1 is a plan view illustrating an example of a parking lot where automated valet parking is performed. The automated valet parking is a service that causes a driverless autonomous driving vehicle 2, after a user (occupant) has got out of the vehicle at a drop-off area in a parking lot [parking place], to travel along a target route according to an instruction from the parking lot side, and that automatically parks the vehicle in a target parking space in the parking lot. The target parking space is a parking space preset as a parking position of the autonomous driving vehicle 2. The target route is a route in the parking lot where the autonomous driving vehicle 2 travels to reach the target parking space. The target route at the time of pick-up is a route on which the vehicle travels to reach a pick-up space to be described later.

The parking lot may be a parking lot dedicated to automated valet parking, or may also serve as a parking lot for general vehicles that are not subject to automated valet parking. A part of the parking lot for general vehicles may be used as an area dedicated to automated valet parking. In the present embodiment, a parking lot dedicated to automated valet parking will be used as an example for description.

As illustrated in FIG. 1, a parking lot 50 for automated valet parking includes a parking area 51, a drop-off area 52, a pick-up area 53, and runways 54. In the example of FIG. 1, the drop-off area 52 and the pick-up area 53 are provided separately, but they may be provided integrally. A position reference (for example, a marker) for the autonomous driving vehicle 2 to recognize the vehicle position may be installed on the runways 54.

The parking area 51 is a place where parking spaces (parking frames) 61 in which the autonomous driving vehicle 2 is parked by the automated valet parking are formed. In FIG. 1, the plurality of parking spaces 61 are formed to be arranged in one direction (the width direction of the parked vehicle) as an example. The drop-off area 52 is provided near the exit and entrance of the parking lot 50, and is a place where an occupant including a user gets out of the autonomous driving vehicle 2 before entering the parking space. The drop-off area 52 is formed with drop-off spaces 62 for the autonomous driving vehicle 2 to stop when the occupant gets out of the vehicle. The pick-up area 53 is provided near the exit and entrance of the parking lot 50, and is a place where the occupant gets on the autonomous driving vehicle 2 that has been picked up. The pick-up area 53 is formed with pick-up spaces 63 where the autonomous driving vehicle 2 waits for the occupant to get on the vehicle.

[Configuration of Automated Valet Parking System]

Figure 2:
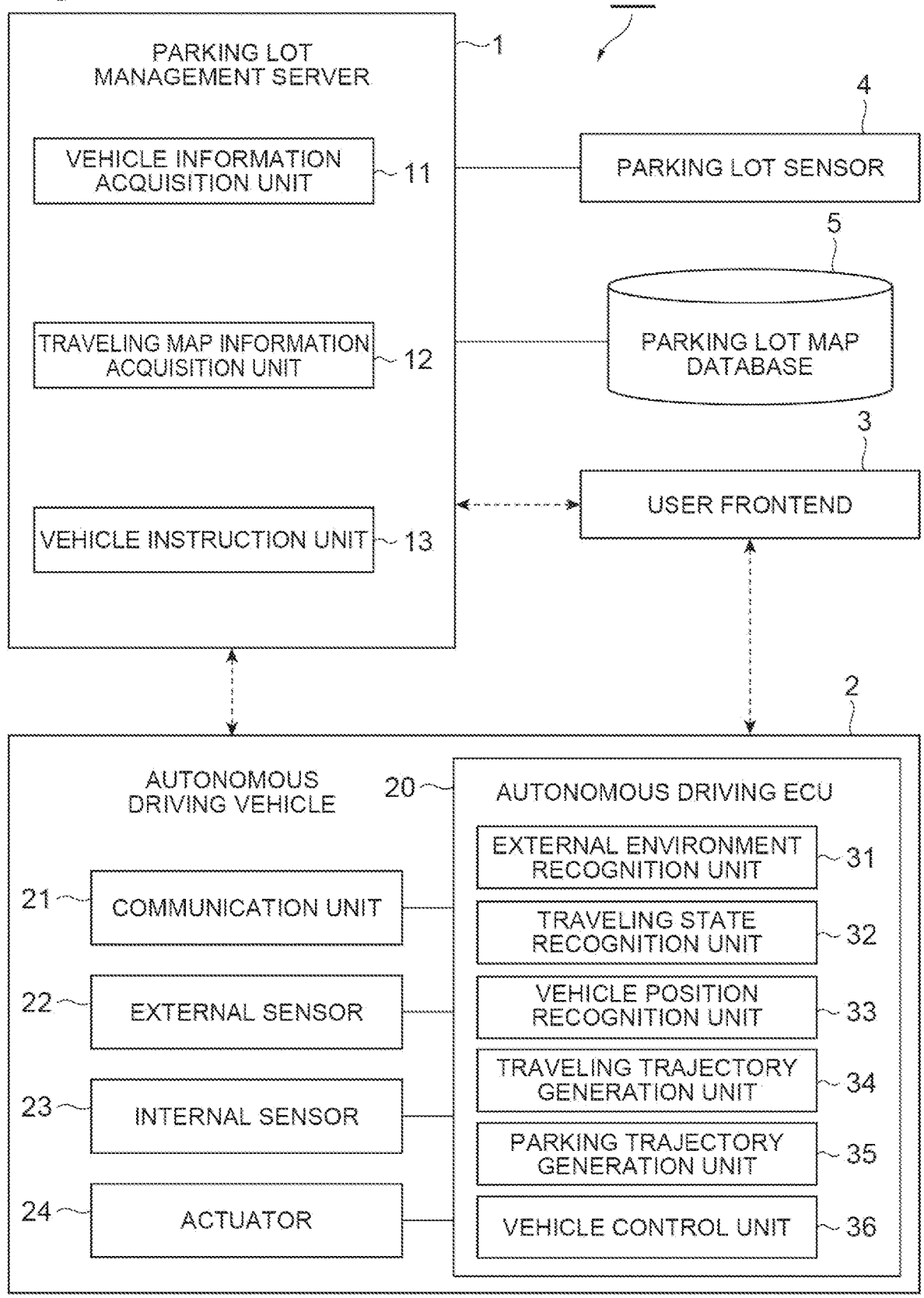
FIG. 2 is a block diagram illustrating an automated valet parking system according to an embodiment.

Hereinafter, the configuration of the automated valet parking system 100 will be described with reference to the drawings. FIG. 2 is a block diagram illustrating an automated valet parking system 100 according to an embodiment. The automated valet parking system (AVPS) 100 illustrated in FIG. 2 is a system for performing automated valet parking of an autonomous driving vehicle 2 in a parking lot. In the automated valet parking system 100, a parking lot management server 1 that manages the parking lot 50 gives an instruction to the autonomous driving vehicle 2 in the parking lot 50 to cause the autonomous driving vehicle 2 to be automatically parked in a target parking space in the parking lot 50. In the following description, the autonomous driving vehicle 2 that is the target of automated parking may be referred to as a "target vehicle 2X".

In the automated valet parking system 100, for example, after the target vehicle 2X that has entered the parking lot 50 drops off the occupant in the drop-off space 62, the automated valet parking is started by obtaining an instruction authority of the target vehicle 2X. The automated valet parking system 100 causes the target vehicle 2X to travel toward a target parking space in the parking area 51, and parks the target vehicle 2X in a target parking space. The automated valet parking system 100 causes the target vehicle 2X that is parked to travel toward the pick-up area 53 in response to a pick-up request, and causes the target vehicle 2X to wait for the occupant to arrive in the pick-up space 63.

The automated valet parking system 100 herein is, as an example, configured to execute "autonomous traveling control" for causing the autonomous driving vehicle 2 to autonomously drive to an entrance of the target parking space along the runway 54 and "automated parking control" for causing the autonomous driving vehicle 2 that has reached the entrance of the target parking space to be automatically parked in the target parking space. The autonomous traveling control is performed by an autonomous driving electric control unit (ECU) 20 mounted on the autonomous driving vehicle 2 based on traveling map information transmitted from the parking lot management server 1 to the target vehicle 2X.

As illustrated in FIG. 2, the automated valet parking system 100 includes the parking lot management server 1. The parking lot management server 1 is a server for managing the parking lot and functions as a control center.

The parking lot management server 1 is configured to communicate with the autonomous driving vehicle 2. The parking lot management server 1 may be configured to communicate with a user frontend 3. The details of the autonomous driving vehicle 2 and the user frontend 3 will be described later. The parking lot management server 1 may be provided in the parking lot or may be provided in a facility away from the parking lot. The parking lot management server 1 may include a plurality of computers provided at different places. The automated valet parking system 100 does not necessarily include the user frontend 3.

The parking lot management server 1 is connected to a parking lot sensor 4 and a parking lot map database 5. The parking lot sensor 4 is a parking lot infrastructure sensor for recognizing the status in the parking lot 50. The parking lot sensor 4 includes a fixed camera that captures an obstacle present in the parking lot 50. Examples of obstacles include vehicles other than the target vehicle 2X, pillars of the parking lot 50, gates of the parking lot 50, walls of the parking lot 50, poles, safety cones, falling articles on the runway 54, and the like. The fixed camera may be installed on the ceiling or wall of the parking lot 50. The fixed camera transmits the captured image to the parking lot management server 1.

The parking lot sensor 4 may include an empty vehicle sensor for detecting whether or not a parked vehicle is present in each parking space (whether each parking space is occupied or empty). As the empty vehicle sensor, a sensor having a known configuration can be used. The above-mentioned fixed camera may be used as an empty vehicle sensor.

The parking lot map database 5 is a database that stores parking lot map information. The parking lot map information includes position information on the parking space in the parking lot 50, position information on the drop-off space, position information on the pick-up space, and information on the runway 54 in the parking lot 50. The parking lot map information includes the position information on the object used for recognizing the vehicle position of the autonomous driving vehicle 2. The parking lot map information may include position information on a driving boundary used for the autonomous driving of the autonomous driving vehicle 2.

The object means an article serving as a reference of a relative position for recognizing the position of the autonomous driving vehicle 2 in the parking lot 50. As the object, the article provided in the parking lot 50 can be used. The object may divide the parking space 61. As the object that divides the parking space 61, for example, at least one of a lane marking that divides the parking space 61, a pole that divides the parking space 61, a road stud that divides the parking space 61, a pillar of the parking lot 50, a wall of the parking lot 50, a safety cone that divides the parking space 61, and the like is used. Position information on the object detected by an external sensor 22 described later is used, in addition to the position information on the object included in the parking lot map information, or instead of the position information on the object included in the parking lot map information, in order to execute automated parking with high accuracy.

The driving boundary means an object that can define a travelable range when the autonomous driving vehicle 2 travels in autonomous driving. As the driving boundary, a position on the object fixedly provided in the parking lot 50 can be used. As the driving boundary, for example, at least one of a predetermined position (for example, an apex) on the surface of a pillar of the parking lot 50, a predetermined position on a wall surface of the parking lot 50, an installation position of a pole, an installation position of a safety cone, an installation position of a road stud, and the like is used.

Further, the parking lot map information may include position information on a plurality of nodes 64 preset corresponding to a plurality of runways 54 in the parking lot 50, a portion where the runway 54 curves, and the radius of curvature thereof. The position information on the node 64 can be, for example, coordinates on a two-dimensional map coordinate system. The two-dimensional coordinate system may be, for example, an X axis and a Y axis that are orthogonal to each other along the horizontal plane with any corner of the parking lot 50 as the origin. A Z axis orthogonal to the X axis and the Y axis may be defined, and the Z-coordinates may correspond to the first floor, the second floor, and the like of a multi-story car park.

In FIG. 1, a plurality of nodes 64 preset corresponding to a plurality of runways 54 in the parking lot 50 are illustrated by circles. As an example, some of the plurality of nodes 64 are arranged apart from one another at predetermined intervals on an imaginary line extending along the plurality of runways 54 in the parking lot 50. In the example of FIG. 1, an imaginary line extending along the plurality of runways 54 in the parking lot 50 is indicated by a one-dot chain line. The predetermined interval does not necessarily have to be constant. In the lane width direction of the runway 54, the plurality of nodes 64 are located near the center of the runway 54 in the lane width direction, for example.

For example, in a straight-line section of the runway 54, a pair of nodes 64 are set at end points (start point and ending point) of the straight-line section. The nodes 64 may be further set in the section sandwiched between the end points of the straight-line section of the runway 54. The start point and the ending point of the curve section of the runway 54 are defined by the nodes 64 located at the end points on the curve section side of the end points of the straight-line section sandwiching the curve section. These nodes 64 are used as traveling coordinates (described later) that constitute a traveling map for the autonomous driving vehicle 2 to autonomously drive along the runway 54. The node located in front of the parking space 61 may be given a type of, for example, "in front of the parking space".

The node 64 may be set at the entrance of each parking space 61 if an entrance of each parking space 61 faces the runway 54. In the example of FIG. 1, the node 64 is set on the front frame line corresponding to the entrance of the parking space 61. These nodes may be used when the autonomous driving vehicle 2 performs the automated parking control to the target parking space 61. The nodes may be further set around the parking space 61.

Figure 3:
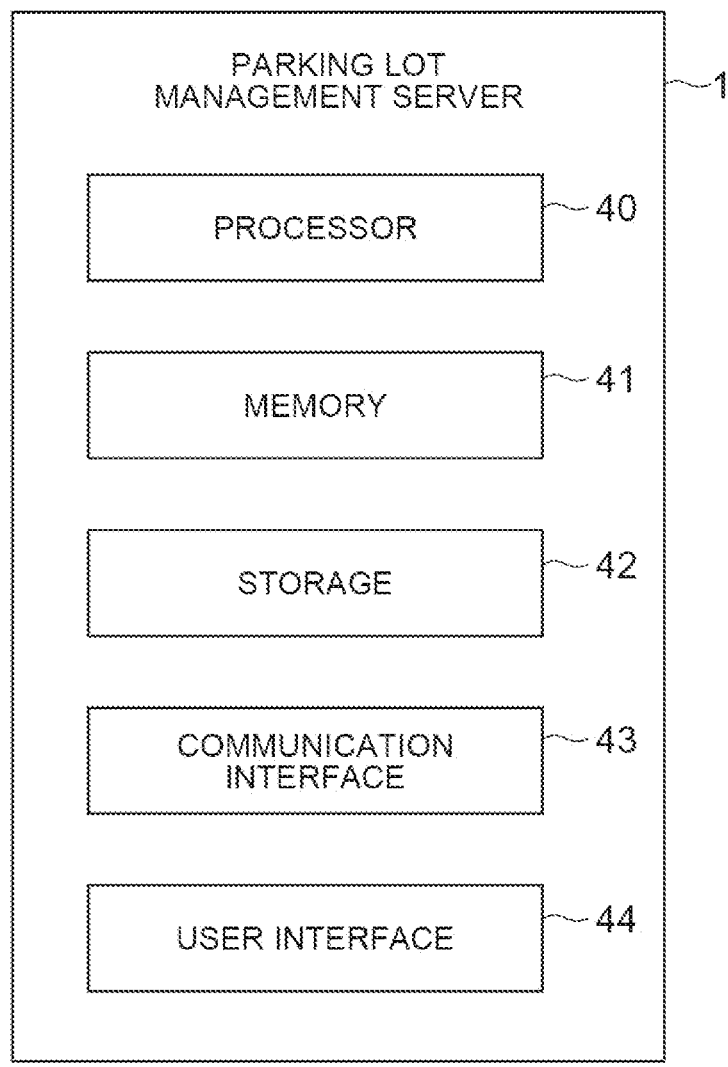
FIG. 3 is a block diagram illustrating an example of a hardware configuration of a parking lot management server.

A hardware configuration of the parking lot management server 1 will be described. FIG. 3 is a block diagram illustrating an example of a hardware configuration of the parking lot management server. As illustrated in FIG. 3, the parking lot management server 1 is configured as a general computer including a processor 40, a memory 41, a storage 42, a communication interface 43, and a user interface 44.

The processor 40 operates various operating systems to control the parking lot management server 1. The processor 40 is an arithmetic logic unit such as a central processing unit (CPU) including a control device, an arithmetic device, a register, and the like. The processor 40 centrally controls the memory 41, the storage 42, the communication interface 43, and the user interface 44. The memory 41 is a recording medium such as a read only memory (ROM), and a random access memory (RAM). The storage 42 is a recording medium such as a hard disk drive (HDD).

The communication interface 43 is a communication device for performing wireless communication through a network. As the communication interface 43, a network device, a network controller, a network card, or the like can be used. The parking lot management server 1 communicates with the autonomous driving vehicle 2 and the user frontend 3 using the communication interface 43. The user interface 44 is an input/output unit of the parking lot management server 1 for an administrator of the parking lot management server 1 or the like. The user interface 44 includes an output device such as a display and a speaker, and an input device such as a touch panel.

Next, a functional configuration of the parking lot management server 1 will be described. As illustrated in FIG. 2, the parking lot management server 1 includes a vehicle information acquisition unit 11, a traveling map information acquisition unit (traveling coordinate acquisition unit) 12, and a vehicle instruction unit 13.

The vehicle information acquisition unit 11 acquires vehicle information on the autonomous driving vehicle 2 through communication with the autonomous driving vehicle 2. The vehicle information includes identification information on the autonomous driving vehicle 2, and vehicle position information on the autonomous driving vehicle 2 and information on the target parking space in the parking lot. The vehicle position information is information about the vehicle position which is the position of the autonomous driving vehicle 2 on the parking lot map. The identification information may be any information as long as it can specify each of the autonomous driving vehicles 2. The identification information may be an identification number (ID number), a vehicle number, a reservation number for automated valet parking, or the like.

The vehicle information includes an object recognition range (details will be described later) of an external sensor 22 of the autonomous driving vehicle 2. The vehicle information may include the vehicle type of the autonomous driving vehicle 2. The vehicle information may include vehicle body information such as a turning radius, a total length, a vehicle width, and a total height of the autonomous driving vehicle 2. The vehicle information may include information representing the vehicle class of the autonomous driving vehicle 2 as vehicle body information.

The vehicle information may include recognition results of a traveling state of the autonomous driving vehicle 2 and an external environment. In addition, the vehicle information may include a vehicle number in addition to the identification information. Information regarding an autonomous driving function may include version information on the autonomous driving. The vehicle information may include vehicle entrance reservation information such as a vehicle entrance reservation time, or may include a scheduled pick-up time. Information regarding an autonomous driving function of the autonomous driving vehicle 2 may be included.

The traveling map information acquisition unit 12 acquires traveling map information based on, for example, the vehicle position of the target vehicle 2X, the position of the target parking space, the map information on the parking lot 50, and the status of the parking lot 50 before the start of the autonomous traveling control of the target vehicle 2X. The traveling map information is information regarding a traveling map. The traveling map means a traveling path on the parking lot map for the target vehicle 2X to autonomously travel along the runway 54 from a starting location (vehicle position) to a destination location (target parking space) in the parking lot 50.

The traveling map is composed of a plurality of traveling coordinates. As the positions of the plurality of traveling coordinates, for example, the positions of the plurality of nodes 64 arranged along the runway 54 from the vehicle position of the target vehicle 2X to the entrance of the target parking space can be used.

Information on the traveling coordinates can include information on a first coordinate and information on a second coordinate, in addition to the position information on the parking lot map of the plurality of traveling coordinates. The first coordinate is a traveling coordinate located on the runway facing the target parking space. The second coordinate is a traveling coordinate located behind the first coordinate by a predetermined number in an advancing direction of the autonomous driving vehicle 2. The advancing direction is a direction in which the target vehicle 2X advances when the autonomous driving vehicle 2 autonomously travels as the target vehicle 2X. The "behind" means a direction opposite to the advancing direction. The predetermined number is not particularly limited, but may be, for example, one. The predetermined number may be an integer of two or more. The number can be selected for the predetermined number, for example, according to the appropriate path change timing in consideration of the width alignment amount and the expected behavior of the target vehicle 2X, when the target vehicle 2x is aligned closer to the target parking space.

In the example of FIG. 1, among the traveling coordinates 65, 66, and 67 located on the runway 54 facing a target parking space 61T, the traveling coordinate 65 closest to the target parking space 61T can be set as the first coordinate.

Further, in the example of FIG. 1, among the traveling coordinates 65, 66, and 67 located on the runway 54 facing the target parking space 61T, the traveling coordinate 66 located behind the first coordinate by one can be set as the second coordinate. The plurality of traveling coordinates 65, 66, and 67 included in the traveling map constitute a trajectory generated by a traveling trajectory generation unit 34 to be described later.

The traveling map information acquisition unit 12 acquires information on a plurality of traveling coordinates arranged along the runway 54 of the parking lot 50 to the entrance of the target parking space based on the vehicle position of the autonomous driving vehicle 2, the position of the target parking space, and the map information on the parking lot 50. The traveling map information acquisition unit 12 acquires a traveling path obtained by connecting a plurality of acquired traveling coordinates to each other as a traveling map.

The vehicle instruction unit 13 instructs the autonomous driving vehicle 2 to perform automated valet parking. The vehicle instruction unit 13 uses the traveling map acquired by the traveling map information acquisition unit 12 as a target route for the target vehicle 2X to reach a destination location such as a target parking space. The vehicle instruction unit 13 distributes the traveling map information acquired by the traveling map information acquisition unit 12, the target vehicle speed of the target vehicle 2X, and the like to the target vehicle 2X as traveling instruction information.

Subsequently, the autonomous driving vehicle 2 and the user frontend 3 that communicate with the parking lot management server 1 will be described.

As illustrated in FIG. 2, the autonomous driving vehicle 2 includes an autonomous driving ECU 20 as an example. The autonomous driving ECU 20 is an electronic control unit including a CPU, a ROM, a RANI, and the like. In the autonomous driving ECU 20, for example, a program recorded in the ROM is loaded into the RANI, and various functions are implemented by the CPU executing the program loaded into the RANI. The autonomous driving ECU 20 may include a plurality of electronic units.

The autonomous driving ECU 20 is connected to a communication unit 21, an external sensor 22, an internal sensor 23, and an actuator 24.

The communication unit 21 is a communication device that controls wireless communication with the outside of the autonomous driving vehicle 2. The communication unit 21 transmits and receives various types of information through communication with the parking lot management server 1. The communication unit 21 transmits, for example, vehicle information to the parking lot management server 1 and acquires information (for example, traveling map information) needed for automated valet parking from the parking lot management server 1. In addition, the communication unit 21 may perform communication with the user frontend 3 associated with the autonomous driving vehicle 2.

The external sensor 22 is an in-vehicle sensor that detects an external environment of the autonomous driving vehicle 2. The external sensor 22 includes at least a front camera. The front camera is an imaging device that captures an image of an external environment of the autonomous driving vehicle 2. The front camera is provided, for example, behind a windshield of the autonomous driving vehicle 2 and captures an image in front of the vehicle. The front camera transmits imaging information regarding the external environment of the autonomous driving vehicle 2 to the autonomous driving ECU 20. The front camera may be a monocular front camera or a stereo front camera. A plurality of front cameras may be provided, and in addition to the front of the autonomous driving vehicle 2, the right and left sides and the rear may be imaged.

The external sensor 22 may include a radar sensor. The radar sensor is a detection device that detects an object around the autonomous driving vehicle 2 using radio waves (for example, millimeter waves) or light. The radar sensor includes, for example, a millimeter wave radar or a light detection and ranging (LiDAR). The radar sensor transmits radio waves or light to the vicinity of the autonomous driving vehicle 2 and detects the object by receiving the radio waves or light reflected by the object. The radar sensor transmits the detected object information to the autonomous driving ECU 20. In addition, the external sensor 22 may include a sonar sensor that detects a sound outside the autonomous driving vehicle 2.

The external sensor 22 may include a side camera. The side camera is an imaging device that captures an image of an external environment on one or more sides of the autonomous driving vehicle 2. The side cameras are provided, for example, on the lower end sides of right and left door mirrors of the autonomous driving vehicle 2 to face downward, and captures an image of a predetermined range extending in the front-rear direction on the side of the vehicle. The captured image of a predetermined range is used for recognizing the object used for recognizing the vehicle position of the autonomous driving vehicle 2. The captured image of a predetermined range may be used for other purposes such as a panoramic view monitor function. The side camera transmits imaging information regarding the external environment on the side of the autonomous driving vehicle 2 to the autonomous driving ECU 20.

An object recognition range is predetermined for the external sensor 22. The object recognition range is a range in which an object is recognized with at least a certain accuracy using the external sensor 22. The "object recognition using the external sensor 22" means recognizing an object for recognizing the entrance of the target parking space using the external sensor 22. As the object for recognizing the entrance of the target parking space, at least one of a lane marking that divides the parking space 61, a pole that divides the parking space 61, a road stud that divides the parking space 61, a pillar of the parking lot 50, a wall of the parking lot 50, a safety cone that divides the parking space 61, and the like is used. The object for recognizing the entrance of the target parking space may be the same as the object that divides the parking space 61, and may be used as a basis for recognizing the vehicle position of the autonomous driving vehicle 2. The object recognition range may be defined for the sensor used for recognizing the entrance of the target parking space in the external sensors 22.

The object recognition range is defined as, for example, a predetermined range extending around the autonomous driving vehicle 2 based on a predetermined position of the autonomous driving vehicle 2 (for example, the vehicle center of the autonomous driving vehicle 2) in plan view. Such a predetermined range can be determined based on the specifications (vehicle width and total length) of the autonomous driving vehicle 2, the mounting position of the external sensor 22 in the autonomous driving vehicle 2, and the range in which the object can be recognized from the mounting position with at least a certain accuracy using the external sensor 22. As an example, when the external sensor 22 is a side camera, a rectangular area of about 5 m to 6 m in the vehicle width direction and about 8 m in the vehicle front-rear direction can be used as an object recognition range SR in vehicle plan view (see FIGS. 4 to 7). The object recognition range is not limited to this example.

The internal sensor 23 is an in-vehicle sensor that detects a traveling state of the autonomous driving vehicle 2. The internal sensor 23 includes a vehicle speed sensor, an acceleration sensor, and a yaw rate sensor. The vehicle speed sensor is a detector that detects the speed of the autonomous driving vehicle 2. As the vehicle speed sensor, wheel speed sensors that are provided for wheels of the autonomous driving vehicle 2 or for drive shafts that rotate integrally with the wheels and that detect rotation speeds of the respective wheels can be used. The vehicle speed sensor transmits the detected vehicle speed information (wheel speed information) to the autonomous driving ECU 20.

The acceleration sensor is a detector that detects the acceleration of the autonomous driving vehicle 2. The acceleration sensor includes, for example, a longitudinal acceleration sensor that detects the longitudinal acceleration of the autonomous driving vehicle 2. The acceleration sensor may include a lateral acceleration sensor that detects the lateral acceleration of the autonomous driving vehicle 2. The acceleration sensor transmits, for example, acceleration information of the autonomous driving vehicle 2 to the autonomous driving ECU 20. The yaw rate sensor is a detector that detects a yaw rate (rotational angular velocity) of the center of gravity of the autonomous driving vehicle 2 around a vertical axis. As the yaw rate sensor, for example, a gyro sensor can be used. The yaw rate sensor transmits the detected yaw rate information of the autonomous driving vehicle 2 to the autonomous driving ECU 20.

The actuator 24 is a device used for controlling the autonomous driving vehicle 2. The actuator 24 includes at least a drive actuator, a brake actuator, and a steering actuator. The drive actuator controls a supply amount of air to the engine (throttle opening degree) according to a control signal from the autonomous driving ECU 20 to control a driving force of the autonomous driving vehicle 2. When the autonomous driving vehicle 2 is a hybrid vehicle, the control signal from the autonomous driving ECU 20 is input to a motor as a power source in addition to the supply amount of air to the engine, so that the driving force of the autonomous driving vehicle 2 is controlled. When the autonomous driving vehicle 2 is an electric vehicle, the control signal from the autonomous driving ECU 20 is input to a motor as a power source, so that the driving force of the autonomous driving vehicle 2 is controlled. The motor as the power source in these cases constitutes the actuator 24.

The brake actuator controls a brake system according to the control signal from the autonomous driving ECU 20 to control a braking force applied to the wheels of the autonomous driving vehicle 2. As the brake system, for example, a hydraulic brake system can be used. The steering actuator controls driving of an assist motor for controlling a steering torque in an electric power steering system according to the control signal from the autonomous driving ECU 20. Thereby, the steering actuator controls the steering torque of the autonomous driving vehicle 2.

Next, an example of a functional configuration of the autonomous driving ECU 20 will be described. The autonomous driving ECU 20 includes an external environment recognition unit 31, a traveling state recognition unit 32, a vehicle position recognition unit 33, a traveling trajectory generation unit (trajectory generation unit) 34, a parking trajectory generation unit 35, and a vehicle controller 36.

The external environment recognition unit 31 recognizes the external environment of the autonomous driving vehicle 2 based on the result of detection from the external sensor 22. The result of detection from the external sensor 22 includes an image captured by the side camera. The result of detection from the external sensor 22 may include at least one of an image captured by the front camera and object information detected by the radar sensor.

The external environment includes the position information on the object detected by the external sensor 22. The object herein includes an object for recognizing the entrance of the target parking space facing the runway 54. The external environment recognition unit 31 recognizes an object for recognizing the entrance of the target parking space by white line recognition, pattern matching, or the like. The object detected by the external sensor 22 may be an article whose position information is included in the parking lot map information.

The external environment includes a relative position of surrounding obstacles with respect to the autonomous driving vehicle 2. The external environment may include a relative speed and a moving direction of surrounding obstacles with respect to the autonomous driving vehicle 2. Examples of such obstacles include vehicles other than the target vehicle 2X, gates of the parking lot, falling articles on the runway 54, and the like. The external environment recognition unit 31 recognizes an article that becomes an obstacle by pattern matching or the like.

The traveling state recognition unit 32 recognizes the traveling state of the autonomous driving vehicle 2 based on the result of detection from the internal sensor 23. The traveling state includes the vehicle speed of the autonomous driving vehicle 2, the acceleration of the autonomous driving vehicle 2, and the yaw rate of the autonomous driving vehicle 2. Specifically, the traveling state recognition unit 32 recognizes the vehicle speed of the autonomous driving vehicle 2 based on the vehicle speed information of the vehicle speed sensor. The traveling state recognition unit 32 recognizes the acceleration of the autonomous driving vehicle 2 based on the vehicle speed information of the acceleration sensor. The traveling state recognition unit 32 recognizes the direction of the autonomous driving vehicle 2 based on the yaw rate information of the yaw rate sensor. The traveling state recognition unit 32 may recognize vehicle information on the target vehicle 2X (vehicle type of the autonomous driving vehicle 2, and vehicle body information such as turning radius, total length, total height, and vehicle width of the autonomous driving vehicle 2) as the vehicle characteristics of the host vehicle. These pieces of vehicle information may be stored in advance in the ROM of the autonomous driving ECU 20.

The vehicle position recognition unit 33 recognizes the vehicle position of the autonomous driving vehicle 2 based on the external environment recognized by the external environment recognition unit 31. The vehicle position recognition unit 33 recognizes the vehicle position of the autonomous driving vehicle 2 based on the relative position of the object with respect to the autonomous driving vehicle 2 recognized by the external environment recognition unit 31. Such a vehicle position recognized by using the external sensor 22 is used in the automated parking control of the autonomous driving vehicle 2.

The vehicle position recognition unit 33 may recognize the vehicle position of the autonomous driving vehicle 2 based further on the parking lot map information acquired from the parking lot management server 1 through the communication unit 21. The vehicle position recognition unit 33 may recognize the vehicle position of the autonomous driving vehicle 2 by further using the position information on the object in the parking lot included in the parking lot map information, for example. The vehicle position recognition unit 33 may recognize the position of the autonomous driving vehicle 2 by dead reckoning based further on the result of detection from the internal sensor 23. In addition, the vehicle position recognition unit 33 may recognize the position of the autonomous driving vehicle 2 by further communicating with a beacon provided in the parking lot. Such a vehicle position recognized by using the parking lot map information may be used in the autonomous traveling control of the autonomous driving vehicle 2.

The traveling trajectory generation unit 34 generates a trajectory of the autonomous driving vehicle 2 based on the information on the traveling coordinates and the result of detection from the in-vehicle external sensor 22. The traveling trajectory generation unit 34 generates a trajectory of the target vehicle 2X based on, for example, the traveling map (target route), the position of the target vehicle 2X, the external environment of the target vehicle 2X, and the traveling state of the target vehicle 2X. The trajectory corresponds to a traveling plan for autonomous driving. The trajectory includes a path along which the vehicle travels by autonomous driving and a vehicle speed plan in autonomous driving.

The traveling trajectory generation unit 34 generates a path of the target vehicle 2X along a plurality of traveling coordinates from the starting location to the destination location based on the distributed traveling map information. For example, the traveling trajectory generation unit 34 may sequentially generate paths from the current vehicle position of the target vehicle 2X to the traveling coordinates located several (for example, three) points ahead of the plurality of traveling coordinates included in the traveling map. The trajectory may include information on a deflection angle that determines the posture of the target vehicle 2X in the yaw direction when passing through each traveling coordinate (each node 64) included in the traveling map. The deflection angle is, for example, an angle in which the direction parallel to the positive direction of the X axis is 0 deg and the counterclockwise direction is positive. The trajectory may include information such as the order in which the target vehicle 2X passes through each traveling coordinate included in the traveling map and the time when the target vehicle 2X can pass.

The traveling trajectory generation unit 34 determines whether or not the entrance of the target parking space 61T can be recognized based on the object recognition range SR of the external sensor 22, the information on the traveling coordinate, and the position of the target parking space 61T. For example, assuming that the target vehicle 2X is located in front of the target parking space 61T, the traveling trajectory generation unit 34 determines whether or not an object for recognizing the entrance of the target parking space is included in the object recognition range SR of the external sensor 22.

Specifically, assuming that the position of the vehicle center of the target vehicle 2X coincides with the position of the first coordinate, the traveling trajectory generation unit 34 determines whether or not the entrance of the target parking space 61T can be recognized by determining whether or not the object is included in a range of a distance from the vehicle center of the target vehicle 2X in which the object is recognized with at least a certain accuracy using the external sensor 22 in the direction toward the position of the object for recognizing the entrance of the target parking space when viewed from the vehicle center of the target vehicle 2X.

The determination of whether or not the entrance of the target parking space 61T can be recognized is executed, for example, before the automated valet parking is started. Alternatively, the determination of whether or not the entrance of the target parking space 61T can be recognized may be executed after the automated valet parking is started and before the target vehicle 2X reaches the second coordinate. In this case, the determination may be executed together with sequentially generating paths from the current vehicle position of the target vehicle 2X to the traveling coordinates located several points ahead. The determination of whether or not the entrance of the target parking space 61T can be recognized is executed at least before the target vehicle 2X reaches the first coordinate. That is, the traveling trajectory generation unit 34 generates in advance a trajectory for bringing the autonomous driving vehicle 2 closer to the target parking space 61T on the runway 54 before the autonomous driving vehicle 2 reaches the first coordinate.

Figure 4:
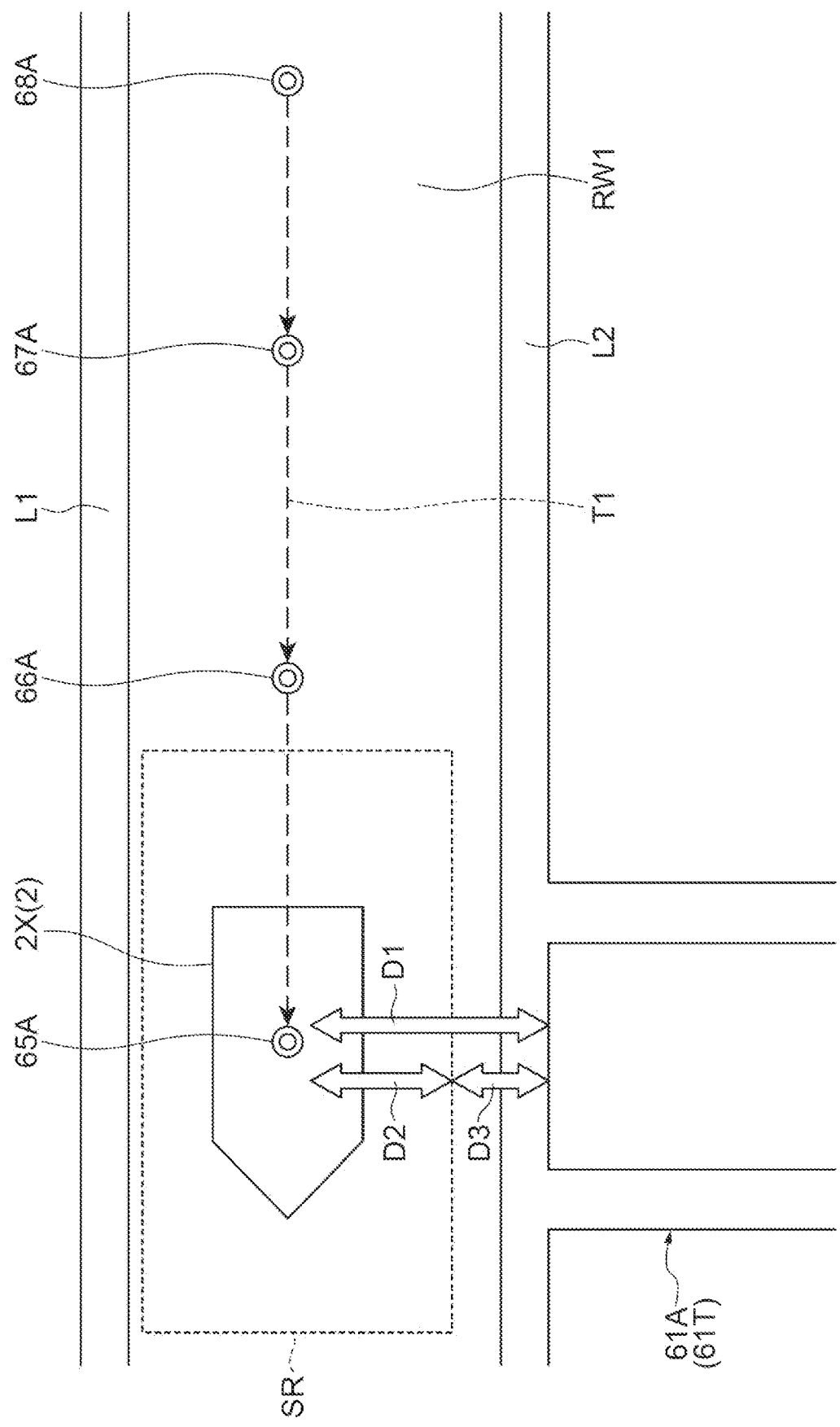
FIG. 4 is a plan view illustrating an example of a case where an entrance of a target parking space is determined to be unrecognizable.

FIG. 4 is a plan view illustrating an example of a case where an entrance of a target parking space is determined to be unrecognizable. FIG. 4 is a plan view on the assumption that the target vehicle 2X autonomously travels along a trajectory T1 to a coordinate (first coordinate) 65A located on a runway RW1 facing a target parking space 61A in order to automatically park the target vehicle 2X in the target parking space 61A located on the left side in the advancing direction of the target vehicle 2X. The trajectory T1 is a trajectory generated as a path extending along coordinates 65A, 66A, 67A, and 68A. The coordinates 65A, 66A, 67A, and 68A are arranged along the runway RW1. It is assumed that the coordinate 66A is the second coordinate.

In the example of FIG. 4, the position of the vehicle center of the target vehicle 2X coincides with the position of the coordinate 65A. In order to recognize an entrance of the target parking space 61A located on the left side of the target vehicle 2X, a lane marking L2 extending to the left side of the target vehicle 2X is set as the object to be recognized by the external sensor 22. The runway RW1 is a straight-line section extending between a pair of lane markings L1 and L2.

In the example of FIG. 4, the traveling trajectory generation unit 34 determines whether or not the lane marking L2 is included in a range of a distance D2 in the direction toward the position of the lane marking L2 (on the left side in the advancing direction) for recognizing the entrance of the target parking space 61A when viewed from the vehicle center (coordinate 65A) of the target vehicle 2X. The distance D2 is a distance from the vehicle center of the target vehicle 2X in which the object is recognized with at least a certain accuracy using the external sensor 22 on the left side in the advancing direction. The distance D1 is a distance from the vehicle center of the target vehicle 2X to the lane marking L2 on the left side in the advancing direction. The distance D1 can be calculated based on vehicle position information on the target vehicle 2X and parking lot map information (position information on the lane marking L2).

In FIG. 4, since the lane marking L2 is not included in the range of the distance D2, the traveling trajectory generation unit 34 determines that the entrance of the target parking space 61A cannot be recognized. When it is determined that the entrance of the target parking space 61A cannot be recognized, the traveling trajectory generation unit 34 generates a trajectory T2 that brings the target vehicle 2X closer to the target parking space 61A on the runway RW1 so that the lane marking L2 for recognizing the entrance of the target parking space 61A is included in the object recognition range SR (see FIG. 5). The trajectory T2 is a traveling trajectory having a path that brings the target vehicle 2X closer to the target parking space 61A on the runway RW1 as compared with the trajectory T1.

Figure 5:
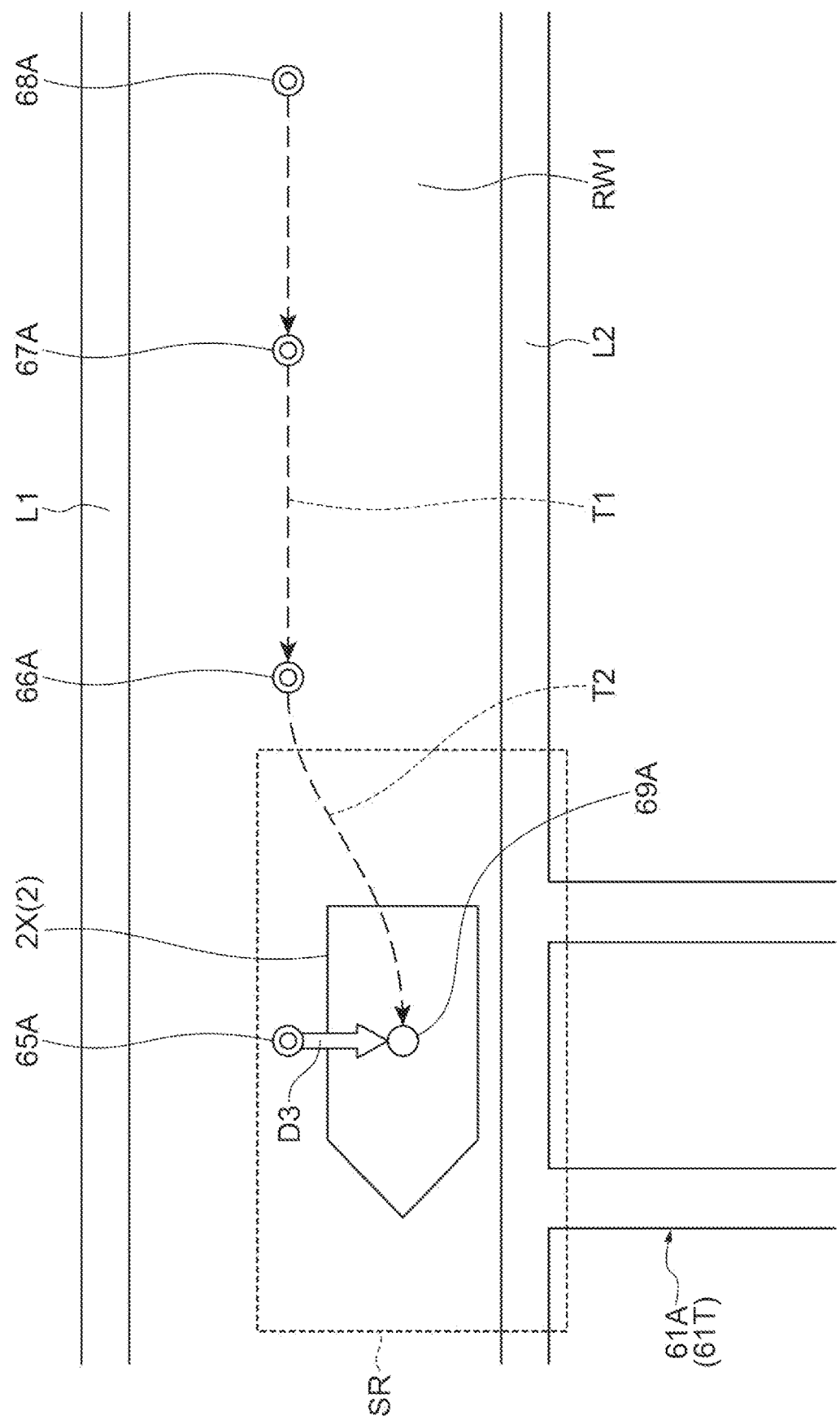
FIG. 5 is a plan view illustrating an example of a trajectory that brings an autonomous driving vehicle closer to the target parking space on a runway.

FIG. 5 is a plan view illustrating an example of a trajectory that brings the autonomous driving vehicle closer to the target parking space on a runway. FIG. 5 is different from the situation of FIG. 4 in that a trajectory T2 that brings the target vehicle 2X closer to the target parking space 61A is generated in a section from the coordinate 66A to a coordinate 69A. That is, the traveling trajectory generation unit 34 generates a trajectory T2 to bring the autonomous driving vehicle 2 closer to the target parking space 61A in a section ahead of the coordinates 66A (second coordinate).

The coordinate 69A of the trajectory T2 is moved to the left in the advancing direction of the target vehicle 2X by a distance D3 as compared with the coordinate 65A of the trajectory T1. The distance D3 corresponds to a distance obtained by subtracting the distance D2 from the distance D1 in the example of FIG. 4. In the example of FIG. 4, since the lane marking L2 is not included in the range of the distance D2, the distance D3 is a positive value. By moving the trajectory T2 to the left by the distance D3, the lane marking L2 can be included in the range of the distance D2 as illustrated in FIG. 5. The coordinate 69A of the trajectory T2 may be newly set as a coordinate different from the coordinate 65A of the trajectory T1, or may be handled to move the coordinate 65A of the trajectory T1 instead of being newly set.

In the examples of FIGS. 4 and 5, although the target parking space 61A extends at a right angle to the advancing direction of the target vehicle 2X, the parking space 61 may extend in a direction diagonally intersecting the advancing direction of the target vehicle 2X. The generation of the trajectory T2 as described above is also effective for such a parking spaces.

Figure 6:
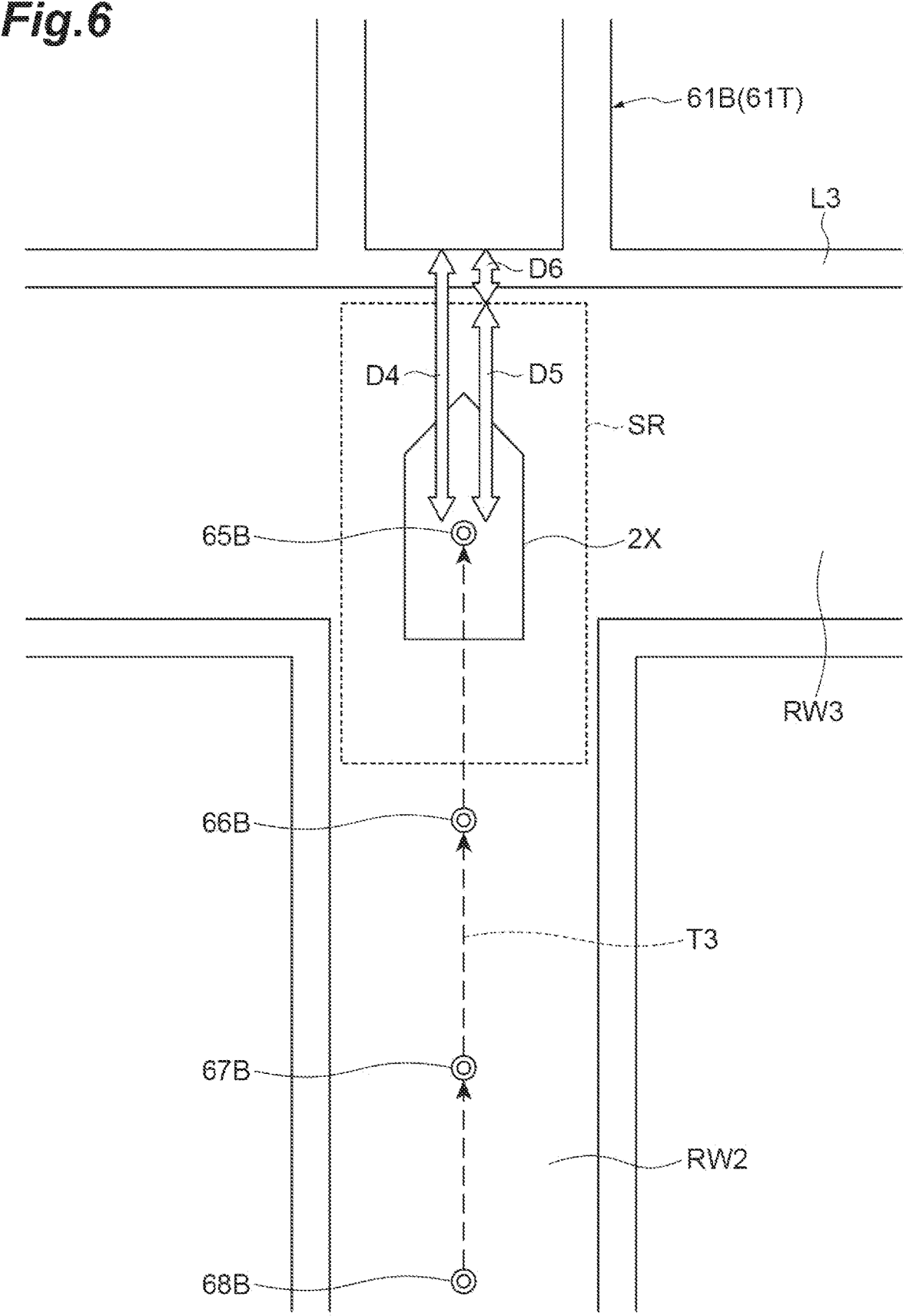
FIG. 6 is a plan view illustrating another example of a case where the entrance of the target parking space is determined to be unrecognizable.

Another specific example will be described. FIG. 6 is a plan view illustrating another example of a case where the entrance of the target parking space is determined to be unrecognizable. FIG. 6 is a plan view on the assumption that the target vehicle 2X autonomously travels along a trajectory T3 to a coordinate (first coordinate) 65B located on a runway RW3 facing a target parking space 61B in order to automatically park the target vehicle 2X in the target parking space 61B located in front of the advancing direction of the target vehicle 2X. The trajectory T3 is a trajectory generated as a path extending along coordinates 65B, 66B, 67B, and 68B. The coordinates 65B, 66B, 67B, and 68B are arranged along the runway RW2. That is, the runways RW2 and RW3 in FIG. 6 intersect each other as a T-junction. It is assumed that the coordinate 66B is the second coordinate.

In the example of FIG. 6, the position of the vehicle center of the target vehicle 2X coincides with the position of the coordinate 65B. In order to recognize an entrance of the target parking space 61B located in front of the target vehicle 2X, a lane marking L3 extending in front of the target vehicle 2X is set as the object to be recognized by the external sensor 22. The runway RW3 extends along the lane marking L3.

In the example of FIG. 6, the traveling trajectory generation unit 34 determines whether or not the lane marking L3 is included in a range of a distance D5 in the direction toward the position of the lane marking L3 (in front of the advancing direction) for recognizing the entrance of the target parking space 61B when viewed from the vehicle center (coordinate 65B) of the target vehicle 2X. The distance D5 is a distance from the vehicle center of the target vehicle 2X in which the object is recognized with at least a certain accuracy using the external sensor 22 in front of the advancing direction. A distance D4 is a distance from the vehicle center of the target vehicle 2X to the lane marking L3. The distance D4 can be calculated based on vehicle position information on the target vehicle 2X and parking lot map information (position information on the lane marking L3) in front of the advancing direction.

In FIG. 6, since the lane marking L3 is not included in the range of the distance D5, the traveling trajectory generation unit 34 determines that the entrance of the target parking space 61B cannot be recognized. When it is determined that the entrance of the target parking space 61B cannot be recognized, the traveling trajectory generation unit 34 generates a trajectory T4 that brings the target vehicle 2X closer to the target parking space 61B on the runway RW3 so that the lane marking L3 for recognizing the entrance of the target parking space 61B is included in the object recognition range SR (see FIG. 7). The trajectory T4 is a traveling trajectory having a path that brings the target vehicle 2X closer to the target parking space 61B on the runway RW3 as compared with the trajectory T3.

Figure 7:
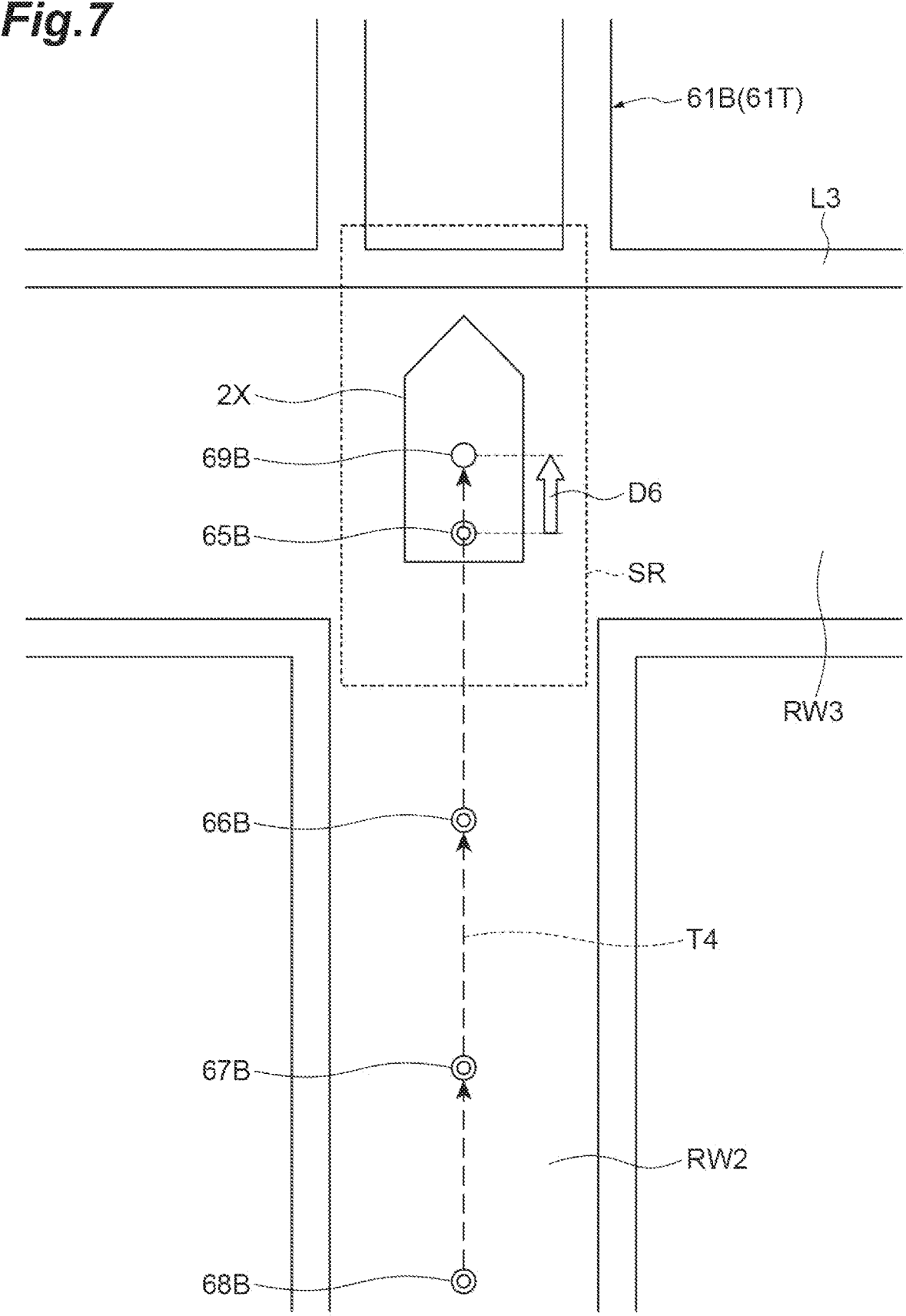
FIG. 7 is a plan view illustrating another example of a trajectory that brings the autonomous driving vehicle closer to the target parking space on a runway.

FIG. 7 is a plan view illustrating another example of a trajectory that brings the autonomous driving vehicle closer to the target parking space on a runway. FIG. 7 is different from the situation of FIG. 6 in that a trajectory T4 that brings the target vehicle 2X closer to the target parking space 61B is generated in a section from the coordinate 66B to a coordinate 69B. That is, the traveling trajectory generation unit 34 generates a trajectory T4 to bring the autonomous driving vehicle 2 closer to the target parking space 61B in a section ahead of the coordinates 66B (second coordinate).

The coordinate 69B of the trajectory T4 is moved forward in the advancing direction of the target vehicle 2X by a distance D6 as compared with the coordinate 65B of the trajectory T3. The distance D6 corresponds to a distance obtained by subtracting the distance D5 from the distance D4 in the example of FIG. 6. In the example of FIG. 6, since the lane marking L3 is not included in the range of the distance D5, the distance D6 is a positive value. By moving (extending) the trajectory T4 forward by the distance D6, the lane marking L3 can be included in the range of the distance D5. The coordinate 69B of the trajectory T4 may be newly set as a coordinate different from the coordinate 65B of the trajectory T3, or may be handled to move the coordinate 65B of the trajectory T3 instead of being newly set.

In the examples of FIGS. 6 and 7, the target parking space 61B may be located in a dead end ahead of the runway RW2. That is, the generation of the trajectory T4 as described above is effective even in the situation of the dead end where the runway RW3 does not extend to the right and left acrossing the advancing direction. In this case, the lane marking L3 may be provided at the entrance of the target parking space 61B.

The parking trajectory generation unit 35 generates a parking trajectory of the target vehicle 2X based on, for example, the position of the target parking space 61T, the position of the target vehicle 2X, the external environment of the target vehicle 2X, and the traveling state of the target vehicle 2X. A known method can be used to generate the parking trajectory of the target vehicle 2X.

The vehicle controller 36 executes autonomous traveling control and automated parking control of the target vehicle 2X. In the autonomous traveling control until the target vehicle 2X reaches the front of the target parking space 61T, the autonomous driving vehicle 2 autonomously travels by a known method along the traveling trajectory of the autonomous traveling control generated by the traveling trajectory generation unit 34. In the automated parking control after the target vehicle 2X reaches the front of the target parking space 61T, the autonomous driving vehicle 2 is automatically parked in the target parking space 61T by a known method along the parking trajectory of the automated parking control generated by the parking trajectory generation unit 35.

The user frontend 3 is a portable information terminal of the user associated with the autonomous driving vehicle 2. The user frontend 3 is registered in the autonomous driving vehicle 2 as the terminal of the owner of the autonomous driving vehicle 2, for example. The user frontend 3 may be a terminal of a user who is registered as an authority holder in the autonomous driving vehicle 2 by a temporary owner by rental or transfer of the instruction authority from the owner. The user frontend 3 is configured by a computer including a processor such as a CPU, a memory such as a ROM or a RAM, and a user interface including a display and a touch panel, for example.

The user frontend 3 has a function of making a vehicle entrance request and a pick-up request to the parking lot management server 1. By operating the user frontend 3, the user can make a vehicle entrance request and a pick-up request for the automated valet parking. For example, the user stops the autonomous driving vehicle 2 in the drop-off space 62 of the drop-off area 52 of the parking lot 50 and gets out of the vehicle, and then gives the parking lot management server 1 the instruction authority for the autonomous driving vehicle 2 by operating the user frontend 3 to complete the vehicle entrance request.

The user causes the autonomous driving vehicle 2 parked in the parking space 61 to travel to the pick-up space 63 of the pick-up area 53 through the parking lot management server 1 by making a pick-up request. The autonomous driving vehicle 2 waits for the user in the pick-up space 63. For example, when the autonomous driving vehicle 2 arrives at the pick-up space 63 and stops, the parking lot management server 1 terminates the instruction authority for the autonomous driving vehicle 2. The instruction authority may be terminated when the user gives an instruction to open the door or start the vehicle to the autonomous driving vehicle 2. The autonomous driving vehicle 2 may terminate the instruction authority. In addition, the operation of the autonomous driving vehicle 2 associated with the vehicle entrance request and the pick-up request is not limited to the above-described aspect. The same applies to the parking lot management server 1.

Figure 8:
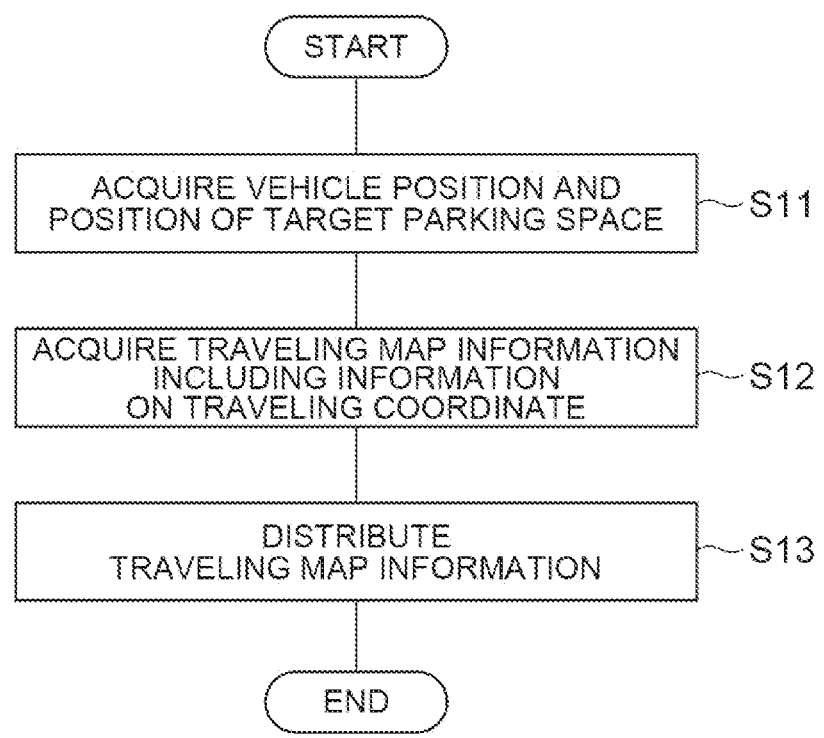
FIG. 8 is a flowchart illustrating instruction processing of the parking lot management server.

[Processing of Automated Valet Parking System] Next, the processing of the automated valet parking system 100 will be described with reference to the drawings. FIG. 8 is a flowchart illustrating instruction processing of the parking lot management server. The instruction processing of the parking lot management server is executed by the parking lot management server 1 before the automated valet parking is started, such as when the autonomous driving vehicle 2 capable of communicating with the parking lot management server 1 enters the parking lot, for example.

As illustrated in FIG. 8, in S11, the parking lot management server 1 of the automated valet parking system 100 causes the vehicle information acquisition unit 11 to acquire information regarding the vehicle position of the target vehicle 2X and the position of the target parking space. In S12, the parking lot management server 1 causes the traveling map information acquisition unit 12 to acquire traveling map information including information on the traveling coordinates. In S13, the parking lot management server 1 causes the vehicle instruction unit 13 to distribute traveling map information. Subsequently, the parking lot management server 1 ends the processing of FIG. 8.

Figure 9:
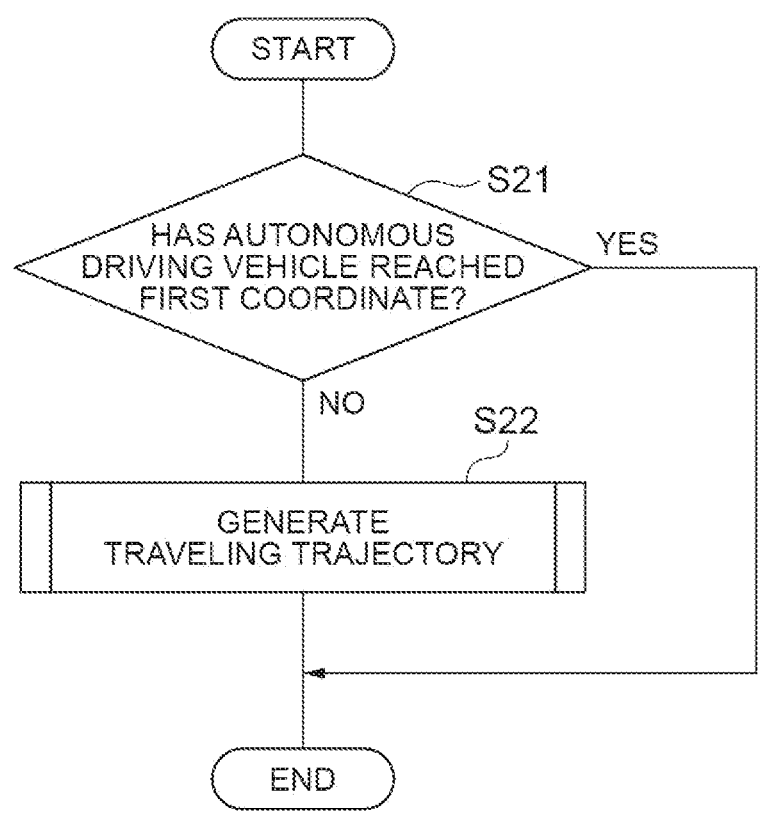
FIG. 9 is a flowchart illustrating traveling trajectory generation processing of an autonomous driving ECU.

FIG. 9 is a flowchart illustrating traveling trajectory generation processing of the autonomous driving ECU. The traveling trajectory generation processing of the autonomous driving ECU 20 is executed by the autonomous driving ECU 20 when the traveling map information is distributed to the target vehicle 2X by the vehicle instruction unit 13 of the parking lot management server 1, for example. The traveling trajectory generation processing of the autonomous driving ECU 20 is processing for generating a traveling trajectory of autonomous traveling control until the target vehicle 2X reaches the entrance of the target parking space.

As illustrated in FIG. 9, in S21, the autonomous driving ECU 20 of the target vehicle 2X causes the traveling trajectory generation unit 34 to determine whether or not the autonomous driving vehicle 2 (target vehicle 2X) has reached the first coordinate. When it is determined that the target vehicle 2X has not reached the first coordinate (S21: NO), the autonomous driving ECU 20 proceeds to processing of S22. In S22, the autonomous driving ECU 20 causes the traveling trajectory generation unit 34 to generate a traveling trajectory based on the distributed traveling map information. Subsequently, the autonomous driving ECU 20 ends the processing of FIG. 9.

On the other hand, when the autonomous driving ECU 20 determines that the target vehicle 2X has reached the first coordinate (S21: YES), the autonomous driving ECU 20 ends the processing of FIG. 9.

Figure 10:
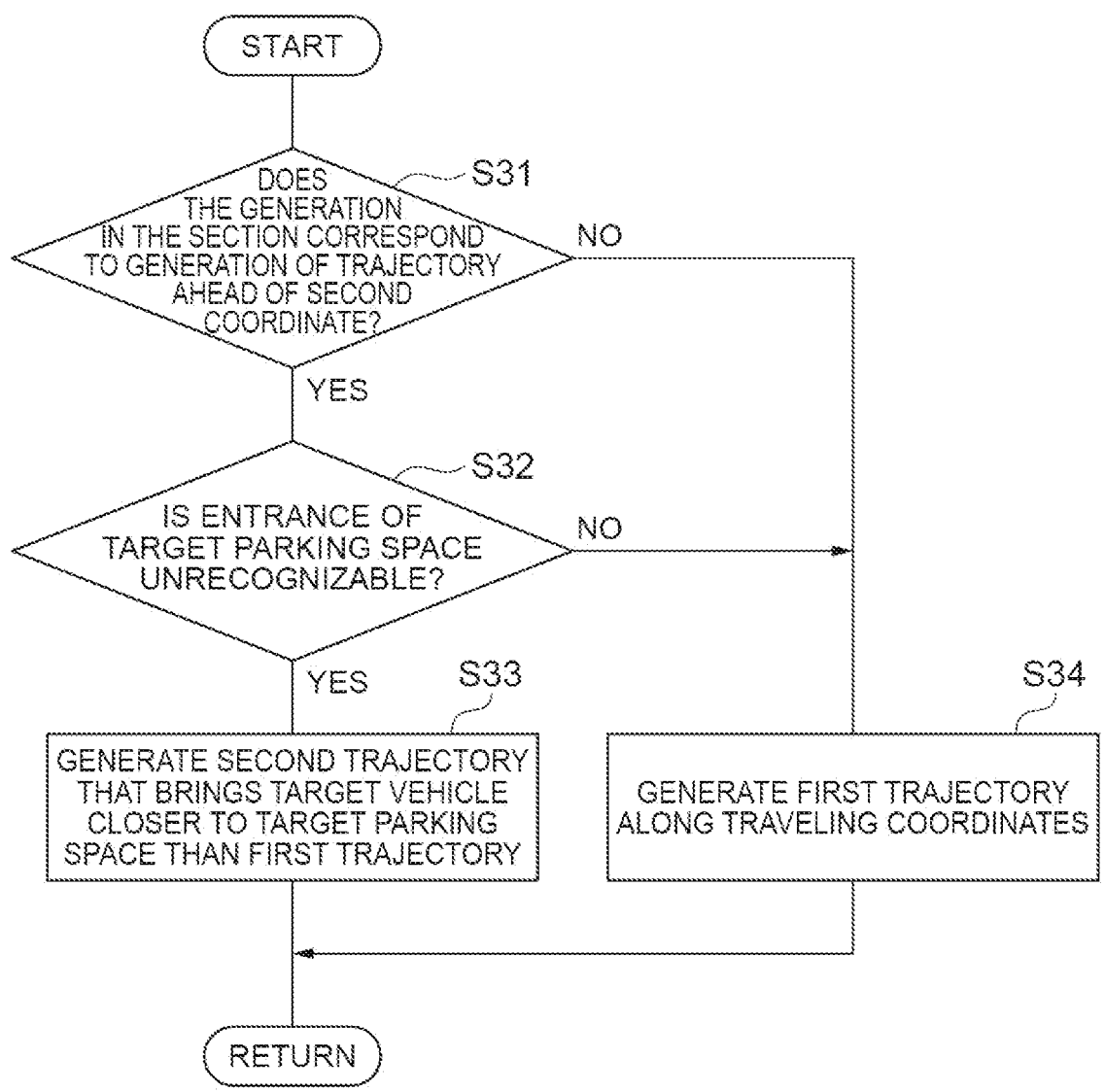
FIG. 10 is a flowchart illustrating a specific example of the traveling trajectory generation processing of FIG. 9.

FIG. 10 is a flowchart illustrating a specific example of the traveling trajectory generation processing of FIG. 9. The autonomous driving ECU 20 performs processing of FIG. 10 as an example of the processing of S22 of the traveling trajectory generation processing of FIG. 9.

In the processing of FIG. 10, the traveling trajectory generation unit 34 generates a traveling trajectory for a predetermined section from a traveling coordinate on the vehicle position side of the target vehicle 2X toward a traveling coordinate on the entrance side of the target parking space among a plurality of traveling coordinates located between the vehicle position of the target vehicle 2X and the entrance of the target parking space. The traveling trajectory generation unit 34 repeats the processing of FIG. 10 to generate a traveling trajectory for all sections from the vehicle position of the target vehicle 2X to the entrance of the target parking space, for example.

As illustrated in FIG. 10, in S31, the autonomous driving ECU 20 of the target vehicle 2X causes the traveling trajectory generation unit 34 to determine whether or not the generation of the traveling trajectory in the section corresponds to the generation of the trajectory ahead of the second coordinate. The traveling trajectory generation unit 34 determines whether or not the generation of the traveling trajectory in the section corresponds to the generation of the trajectory ahead of the second coordinate based on, for example, a vehicle position of the target vehicle 2X, a position of the target parking space, traveling map information, and a position of traveling coordinates forming the section. The "ahead of the second coordinate" means a position closer to the first coordinate than the second coordinate.

When it is determined that the generation of the traveling trajectory in the section corresponds to the generation of the trajectory ahead of the second coordinate (S31: YES), the autonomous driving ECU 20 proceeds to processing of S32. When it is determined that the generation of the traveling trajectory in the section does not correspond to the generation of the trajectory ahead of the second coordinate (S31: NO), the autonomous driving ECU 20 proceeds to processing of S34.

In S32, the autonomous driving ECU 20 causes the traveling trajectory generation unit 34 to determine whether or not the entrance of the target parking space is unrecognizable by using the external sensor 22 of the target vehicle 2X. The traveling trajectory generation unit 34 determines whether or not the entrance of the target parking space is unrecognizable based on, for example, the object recognition range of the external sensor 22, the information on the traveling coordinate, and the position of the target parking space.

When it is determined that the entrance of the target parking space is unrecognizable by using the external sensor 22 (S32: YES), the autonomous driving ECU 20 proceeds to processing of S33. When it is determined that the entrance of the target parking space is not unrecognizable (is recognizable) by using the external sensor 22 (S32: NO), the autonomous driving ECU 20 proceeds to processing of S34.

In S33, the autonomous driving ECU 20 causes the traveling trajectory generation unit 34 to generate a second trajectory that brings the target vehicle 2X closer to the target parking space than the first trajectory. The traveling trajectory generation unit 34 generates the second trajectory so that the object for recognizing the entrance of the target parking space is included in the object recognition range based on, for example, the distributed traveling map information, the object recognition range of the external sensor 22, and the position of the object for recognizing the entrance of the target parking space. Subsequently, the autonomous driving ECU 20 ends the processing of FIG. 10, returns to the processing of FIG. 9, and ends the processing of FIG. 9.

On the other hand, when it is determined that the generation of the traveling trajectory in the section is not the generation of the trajectory ahead of the second coordinate (S31: NO), or when it is determined that the entrance of the target parking space is not unrecognizable (is recognizable) by using the external sensor 22 (S32: NO), in S34, the autonomous driving ECU 20 generates the first trajectory along the traveling coordinates.

Subsequently, the autonomous driving ECU 20 ends the processing of FIG. 10 and repeats the processing of FIG. 10 for the next section to generate a traveling trajectory for all sections from the vehicle position of the target vehicle 2X to the entrance of the target parking space.

With the automated valet parking system 100 described above, whether or not the entrance of the target parking space can be recognized is determined based on the object recognition range of the external sensor 22, the information on the traveling coordinate, and the position of the target parking space. For example, when there is a possibility that the object to be recognized (lane markings L2, L3, or the like) is located outside the object recognition range, it is determined that the entrance of the target parking space 61T is unrecognizable. Therefore, the trajectories T2 and T4 that bring the target vehicle 2X closer to the target parking space 61T on the runways RW1 and RW3 are respectively generated so that the object for recognizing the entrance of the target parking space 61T is included in the object recognition range. Thereby, it is possible to prevent the object to be recognized from being located outside the object recognition range. Therefore, it is possible to ensure the recognition of the object for recognizing the entrance of the target parking space 61T.

In the automated valet parking system 100, the traveling coordinates include the coordinates 65A and 65B which are the coordinates constituting the trajectories T1 and T3 and are located on the runways RW1 and RW3 facing the target parking space 61T, respectively. The traveling trajectory generation unit 34 generates in advance a trajectory for bringing the target vehicle 2X closer to the target parking space 61T on the runways RW1 and RW3 before the target vehicle 2X reaches the coordinates 65A and 65B. Thereby, by generating in advance the trajectories T2 and T4 that bring the target vehicle 2X closer to the target parking space 61T side on the runways RW1 and RW3 respectively, the target vehicle 2X can be caused to travel along the trajectories T2 and T4 before the target vehicle 2X reaches the coordinates 65A and 65B respectively.

In the automated valet parking system 100, the traveling coordinates include the coordinates 65A and 65B that are coordinates constituting the trajectories T1 and T3 and are located on the runways RW1 and RW3 facing the target parking space 61T respectively, and the coordinates 66A and 66B that are coordinates that constitute the trajectories and are located behind the coordinates 65A and 65B by a predetermined number (here, one) in the advancing direction of the target vehicle 2X respectively. The traveling trajectory generation unit 34 generates the trajectories T2 and T4 to bring the target vehicle 2X closer to the target parking space 61T in the section ahead of the coordinates 66A and 66B respectively. Thereby, behind the coordinates 66A and 66B (that is, in the section of the coordinates 66A to 68A and the section of the coordinates 66B to 68B), the target vehicle 2X travels along the trajectories T1 and T3 away from the target parking space 61T on the runways RW1 and RW3 as compared with the sections ahead of the coordinates 66A and 66B respectively. Therefore, for example, when an obstacle such as another vehicle or a pillar is located on the target parking space 61T side, the spatial margin of the target vehicle 2X with respect to the obstacle can be maintained.

In addition, there may be errors due to surveying errors associated with map creation or construction errors when installing objects, between the position of the object stored in the parking lot map information and the position of the object detected by the external sensor 22. When such an error becomes a certain level or more, it may become difficult to recognize the entrance of the target parking space as a result. Even in such a case, according to the automated valet parking system 100, the second trajectory that brings the autonomous driving vehicle closer to the target parking space on the runway is generated, so that the object for recognizing the entrance of the target parking space can be included in the object recognition range.

Although the embodiment of the present disclosure has been described above, the present disclosure is not limited to the above-described embodiment. The present disclosure can be implemented in various for us including various modifications and improvements based on the knowledge of those skilled in the art, including the above-described embodiment.

In the above embodiment, the object recognition range is defined as a rectangular range surrounded by four sides extending in the front-rear direction and the right-left direction of the autonomous driving vehicle 2, but the object recognition range is not limited to this example. The object recognition range may be a range in which an object is recognized with at least a certain accuracy using the external sensor 22 and is a range based on a predetermined position of the autonomous driving vehicle 2, and may be a region having various shapes such as a perfect circle, an ellipse, or another polygon.

In the above embodiment, in the examples of FIGS. 4 to 7, it is assumed that the first coordinate and the predetermined position of the target vehicle 2X coincide with each other, but the present disclosure is not limited to these example. Even if the first coordinate and the predetermined position of the target vehicle 2X are deviated from each other, it may be determined whether or not the entrance of the target parking space can be recognized.

In the above embodiment, the traveling trajectory generation unit 34 generates the trajectories T2 and T4 in advance before the target vehicle 2X reaches the coordinates (first coordinates) 65A and 65B respectively, but the trajectories T2 and T4 may be generated after the target vehicle 2X reaches the coordinates 65A and 65B. In this case, in order to cause the target vehicle 2X to autonomously travel along the generated trajectories T2 and T4, after the target vehicle 2X reaches the coordinates 65A and 65B, the target vehicle 2X may be once retracted to the coordinates 66A and 66B, and the target vehicle 2X may be caused to autonomously travel again along the trajectories T2 and T4 respectively.

In the above embodiment, the coordinates (second coordinates) 66A and 66B are respectively located behind the coordinates (first coordinates) 65A and 65B by one, and the numbers are invariable. But the predetermined number may be variable. For example, the predetermined number may be increased as the instructed speed is faster, depending on the instructed speed when the target vehicle 2X is caused to autonomously travel.

In the above embodiment, the autonomous driving vehicle 2 has the function of the traveling trajectory generation unit 34, but the parking lot management server 1 may have the function of the traveling trajectory generation unit 34. In this case, information such as the object recognition range and the specifications of the autonomous driving vehicle 2 may be transmitted from the autonomous driving vehicle 2 to the parking lot management server 1 by communication.

In the above embodiment, the target parking spaces 61A and 61B are divided by the lane markings L2 and L3 respectively, but the present disclosure is not limited thereto. For example, by using at least one of a lane marking that divides the parking space 61, a pole that divides the parking space 61, a road stud that divides the parking space 61, a pillar of the parking lot 50, a wall of the parking lot 50, a safety cone that divides the parking space 61, and the like, the position of the corner of the parking space 61 may be specified.

In the above embodiment, the trajectory includes information on the deflection angle of the target vehicle 2X when passing through each traveling coordinate included in the traveling map, and information such as the order in which the target vehicle 2X passes through each traveling coordinate included in the traveling map and the time when the target vehicle 2X can pass, but the present disclosure is not limited thereto. For example, the trajectory may be data of a change in the steering angle (steering angle plan) of the autonomous driving vehicle 2 based on the position on the target route, for example. In this case, the position on the target route may be, for example, a set vertical position set at predetermined intervals (for example, 1 m) in the advancing direction on the target route. The steering angle plan may be data in which a target steering angle is associated with each set vertical position.

The parking lot management server 1 does not need to be able to directly communicate with the autonomous driving vehicle 2, and may be configured to communicate through another server or the like. The parking lot management server 1 may communicate with the autonomous driving vehicle 2 through a management server on the manufacturer side of the autonomous driving vehicle 2 or an operation server of Mobility-as-a-Service (Maas), for example.

What is claimed is:

1. An automated valet parking system in which a parking lot management server that manages a parking lot gives an instruction to an autonomous driving vehicle in the parking lot to cause the autonomous driving vehicle to be automatically parked in a target parking space in the parking lot, the system comprising:
    a traveling coordinate acquisition unit configured to acquire information on a plurality of traveling coordinates arranged along a runway of the parking lot to an entrance of the target parking space based on a vehicle position of the autonomous driving vehicle, a position of the target parking space, and parking lot map information; and
    a trajectory generation unit configured to generate a trajectory of the autonomous driving vehicle based on the information on the traveling coordinates and a result of detection from an in-vehicle external sensor,
    wherein the trajectory generation unit is configured to
    determine whether or not the entrance of the target parking space is recognizable based on an object recognition range that is a range in which an object is recognized with at least a certain accuracy using the external sensor and is a range based on a predetermined position of the autonomous driving vehicle, the information on the traveling coordinates, and the position of the target parking space, and
    generate the trajectory that brings the autonomous driving vehicle closer to the target parking space on the runway so that the object for recognizing the entrance of the target parking space is included in the object recognition range when it is determined that the entrance of the target parking space is not recognizable.

2. The automated valet parking system according to claim 1, wherein the traveling coordinates include a first coordinate that is a coordinate constituting the trajectory and is located on the runway facing the target parking space, and
    the trajectory generation unit generates the trajectory for bringing the autonomous driving vehicle closer to the target parking space on the runway in advance before the autonomous driving vehicle reaches the first coordinate.

3. The automated valet parking system according to claim 1, wherein the traveling coordinates include a first coordinate that is a coordinate constituting the trajectory and is located on the runway facing the target parking space, and a second coordinate that is a coordinate constituting the trajectory and is located behind the first coordinate by a predetermined number in an advancing direction of the autonomous driving vehicle, and
    the trajectory generation unit generates the trajectory to bring the autonomous driving vehicle closer to the target parking space in a section ahead of the second coordinate.

* * * * *